United States Patent
Ptasinski et al.

(10) Patent No.: US 8,208,455 B2
(45) Date of Patent: *Jun. 26, 2012

(54) METHOD AND SYSTEM FOR TRANSPORTING CONFIGURATION PROTOCOL MESSAGES ACROSS A DISTRIBUTION SYSTEM (DS) IN A WIRELESS LOCAL AREA NETWORK (WLAN)

(75) Inventors: Henry Ptasinski, San Francisco, CA (US); Edward Carter, Sunnyvale, CA (US); Manoj Thawani, Sunnyvale, CA (US); Manas Deb, San Jose, CA (US); Jeff Vadasz, Los Altos, CA (US); Mahesh Iyer, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/269,989

(22) Filed: Oct. 10, 2011

(65) Prior Publication Data

US 2012/0026916 A1 Feb. 2, 2012

Related U.S. Application Data

(63) Continuation of application No. 11/207,658, filed on Aug. 18, 2005, now Pat. No. 8,036,183.

(60) Provisional application No. 60/671,120, filed on Apr. 14, 2005, provisional application No. 60/602,396, filed on Aug. 18, 2004.

(51) Int. Cl.
*H04W 4/00* (2009.01)
(52) U.S. Cl. ......... 370/338; 370/328; 709/217; 709/225
(58) Field of Classification Search ................. 370/338, 370/328; 709/217, 225
See application file for complete search history.

(56) References Cited

U.S. PATENT DOCUMENTS

2007/0247366 A1* 10/2007 Smith et al. .................. 342/464
2009/0022152 A1* 1/2009 Henry et al. .................. 370/389

* cited by examiner

*Primary Examiner* — Pierre-Louis Desir
(74) *Attorney, Agent, or Firm* — Garlick & Markison; Edward J. Marshall

(57) ABSTRACT

Aspects of a method and system for transporting configuration messages across a DS in a WLAN are presented. Aspects of a method for enabling communication of information in a secure communication system may comprise configuring a wireless client station located in a client network based on configuration information received from a configurator. The configurator is located in a configurator network that is located external to and communicatively coupled to the client network. Aspects of a system for enabling communication of information in a secure communication system may comprise a configurator located in a configurator network that is located external to and communicatively coupled to a client network. The configurator configures a wireless client station located in the client network based on configuration information transmitted by the configurator to the wireless client station.

20 Claims, 15 Drawing Sheets

METHOD AND SYSTEM FOR TRANSPORTING CONFIGURATION PROTOCOL MESSAGES ACROSS A DISTRIBUTION SYSTEM (DS) IN A WIRELESS LOCAL AREA NETWORK (WLAN)

CROSS-REFERENCE TO RELATED APPLICATIONS/INCORPORATION BY REFERENCE

This application is a continuation of U.S. patent application Ser. No. 11/207,658 filed Aug. 18, 2005, which application makes reference to, claims priority to, and claims the benefit of U.S. Provisional Application Ser. No. 60/602,396 filed Aug. 18, 2004; and U.S. Provisional Application Ser. No. 60/671,120 filed Apr. 14, 2005.

This application also makes reference to:
U.S. application Ser. No. 11/207,302 filed Aug. 18, 2005, now U.S. Pat. No. 7,996,664 issued Aug. 9, 2011;
U.S. application Ser. No. 11/207,262 filed Aug. 18, 2005, now U.S. Pat. No. 7,653,036 issued Jan. 26, 2010;
U.S. application Ser. No. 11/208,081 filed Aug. 18, 2005, now U.S. Pat. No. 7,987,499 issued Jul. 26, 2011;
U.S. application Ser. No. 11/208,310 filed Aug. 18, 2005;
U.S. application Ser. No. 11/208,275 filed Aug. 18, 2005;
U.S. application Ser. No. 11/208,346 filed Aug. 18, 2005;
U.S. application Ser. No. 11/207,661 filed Aug. 18, 2005;
U.S. application Ser. No. 11/207,301 filed Aug. 18, 2005, now U.S. Pat. No. 7,343,411 issued Mar. 11, 2008;
U.S. application Ser. No. 11/208,284 filed Aug. 18, 2005; and
U.S. application Ser. No. 11/208,347 filed Aug. 18, 2005, now U.S. Pat. No. 7,930,737 issued Apr. 19, 2011.

All of the above referenced applications are hereby incorporated herein by reference in their entirety.

FIELD OF THE INVENTION

Certain embodiments of the invention relate to wireless network communication. More specifically, certain embodiments of the invention relate to a method and system for transporting configuration protocol messages across a distribution system (DS) in a wireless local area network (WLAN).

BACKGROUND OF THE INVENTION

Currently, with some conventional systems, setting up a wireless network generally requires significant interaction and technical knowledge on the part of a user setting up the network, especially when the user is configuring security options for the network. For computer savvy users, the tasks associated with setting up a wireless network can be time consuming. However, for inexperienced computer users, the tasks associated with setting up a wireless network can be more challenging and consumes significantly greater time than required by computer savvy users.

In general, 802.11-based networks require a significant amount of user interaction during the configuration process. Typically, with conventional 802.11-based networks, the user needs to configure a non-access point station (STA) to associate with an access point (AP), which may require a number of settings to be selected on the STA, and some knowledge of the default configuration of the AP. The user may then access an HTML-based menu on the new AP in order to set various configuration parameters, many of which are difficult for novice and for intermediate users to understand and set correctly. New APs generally start with a configuration that provides no network security, and which utilize a default network name (SSID) that is selected by the manufacturer such as, for example, "Manufacturer Name", "Default", or "wireless". With the proliferation of 802.11 networks, users often experience confusion and network problems when their new AP uses the same SSID as a neighboring AP.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for transporting configuration protocol messages across a distribution system (DS) in a wireless local area network (WLAN) substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for transporting configuration protocol messages across a distribution system (DS) in a wireless local area network (WLAN). In IEEE 802.11 WLAN systems, wireless terminal devices, or wireless terminals, for example personal computers or personal digital assistants, may communicate via radio frequency (RF) channels that may be monitored by unauthorized parties at terminal devices that were not intended to participate in the communication. In response, IEEE 802.11 provides specifications that enable wireless terminal devices to communicate utilizing encryption techniques. The utilization of encryption techniques to securely exchange information between wireless terminals may prevent unauthorized parties from determining the information content carried in communications via a secure RF channel. Prior to being enabled to utilize a WLAN, the wireless terminal device may be required to obtain authorization through a process that comprises authentication.

Enabling a wireless terminal device to obtain authorization and to utilize encryption may require a user to manually configure the wireless terminal. This manual configuration may require a user to possess extensive knowledge about the WLAN that may exceed that of a typical WLAN user. An aspect of the invention may comprise a method that minimizes user interaction and knowledge required to configure a wireless terminal for secure communications in an IEEE 802.11 wireless local area network (WLAN). Components in a system, in accordance with an embodiment of the invention, may comprise a configurator, which may alternatively be referred to as a configurator terminal, configurator device, or configurator station, and a client, which may be alternatively referred to as a client terminal, client device, or client station. A configurator station, or a client station, may be referred to as a station.

The configurator may be a wireless and/or wired terminal device, an Ethernet switching device, or other device in an IEEE 802 local area network (LAN) and/or WLAN. The configurator may be located in an access point, for example. The configurator may provide a service to configure clients, which may be wireless terminal devices, thereby enabling the configured clients to utilize secure RF channels with little interaction required from the user. The client may be a wireless and/or wired terminal device, an Ethernet switching device, or other device in an IEEE 802 LAN and/or WLAN.

Figure 1A:
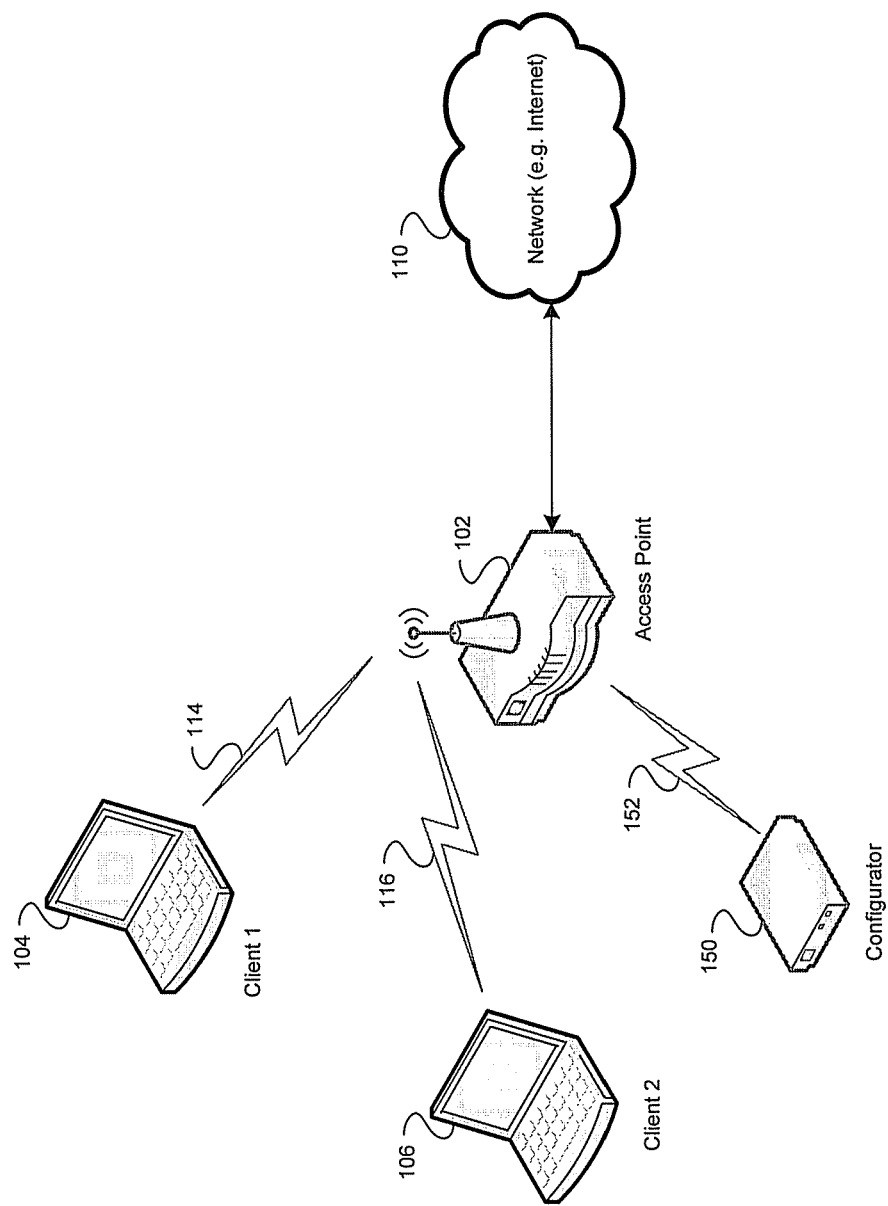
FIG. 1a is a block diagram of an exemplary wireless network, which may be utilized in connection with an embodiment of the invention.

FIG. 1a is a block diagram of an exemplary wireless network, which may be utilized in connection with an embodiment of the invention. Referring to FIG. 1a, there is shown an access point (AP) 102, a plurality of client stations (STA) 104 and 106, a configurator 150, a plurality of RF channels 114, 116, and 152, and a network 110. The AP 102 may be utilized to facilitate communication between a STA 104 and the configurator 150. The STAs 104 and 106 may be wireless terminals such as a PC, a laptop, or a PDA with integrated or plug-in 801.11 capabilities. For example, the PC may utilize a wireless NIC card and the laptop or PDA may comprise integrated 801.11 capabilities. The configurator 150 may comprise a wireless and/or wired interface. The network 110 may be a private or public network, for example, a service provider or the Internet.

In operation, an AP 102 may serve dual roles in a WLAN comprising a station role and a distribution role. An AP 102 may perform a station role when communicating with a STA 104. The AP 102 may perform a distribution role when communicating information via the network 110. In FIG. 1a, the configurator 150 may serve a role that comprises configuring a requesting client station 104. The configured client station 104 may be enabled to communicate information in a secure communications network. The STAs 104 and 106 may comprise non-AP stations. In instances where the STAs 104, 106, and 108 are configured, they may communicate with the AP 102 via corresponding secure RF channels 114 and 116, respectively. The AP 102 may communicate information received from a configured STA 104 or 106, via the Internet 110. In instances where the STAs 104 or 106, are unconfigured, they may communicate with the configurator 150 to request configuration information. The configurator 150 may configure a requesting STA 104 or 106, via an RF channel 152.

Figure 1B:
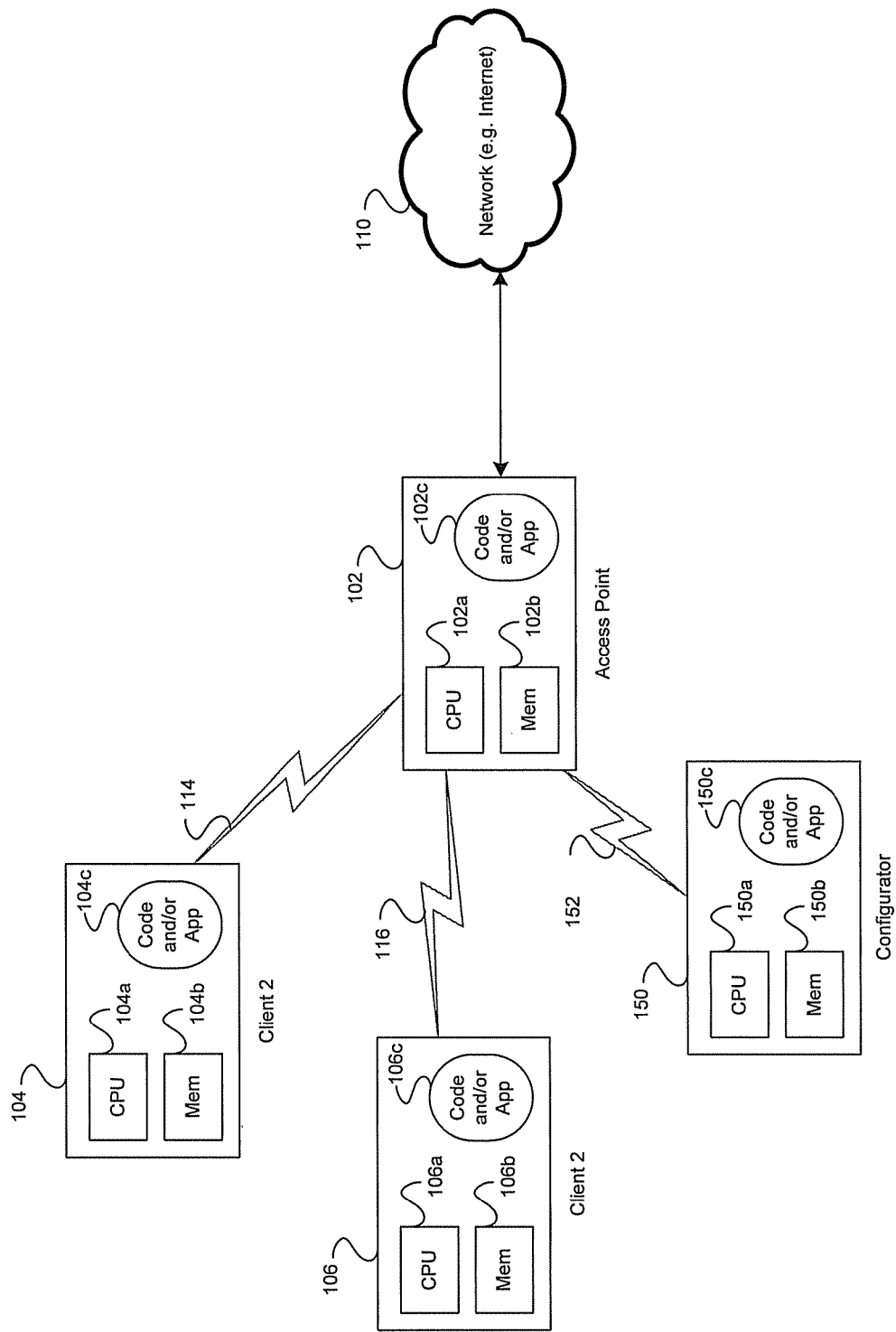
FIG. 1b is a block diagram of a software environment in an exemplary wireless network, which may be utilized in connection with an embodiment of the invention.

FIG. 1b is a block diagram of a software environment in an exemplary wireless network, which may be utilized in connection with an embodiment of the invention. Referring to FIG. 1b, there is shown an access point (AP) 102, a plurality of client stations (STA) 104 and 106, a configurator 150, a plurality of RF channels 114, 116, and 118, and a network 110. The AP 102 may further comprise a central processing unit (CPU) 102a, system memory 102b, and code and/or application software 102c. The STA 104 may further comprise a CPU 104a, system memory 104b, and code and/or application software 104c. The STA 106 may further comprise a CPU 106a, system memory 106b, and code and/or application software 106c. The configurator 150 may further comprise a CPU 108a, system memory 108b, and code and/or application software 108c. The AP 102, and the STAs 104 and 106 may be substantially as described in FIG. 1a.

The CPU 102a, 104a, 106a or 150a may be adapted to perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. The system memory 102b, 104b, 106b or 150b may comprise suitable logic, circuitry, and/or code to be utilized to store, or write, and retrieve, or read, information. It may comprise a plurality of memory technologies such as random access memory (RAM). The code and/or application software 102c, 104c, 106c or 150c may comprise a computer program.

In operation, the system memory 102b or 150b may comprise machine-readable storage having stored thereon at least one code section for enabling communication of information in a secure communication system. The at least one code section may be executable by the CPU 102a or 150a, respectively. The at least one code section may cause the CPU 102a or 150a, respectively, to perform steps related to registering and configuring a client station 104 with the configurator 150.

In operation, the system memory 104b or 106b may comprise machine readable storage having stored thereon, at least one code section for enabling communication of information in a secure communication system. The at least one code section may be executable by the CPU 104a or 106a, respectively. The at least one code section may cause the CPU 104a or 106a to perform steps related to requesting registration and configuration of the client station 104 or 106 with the AP 102.

Figure 2A:
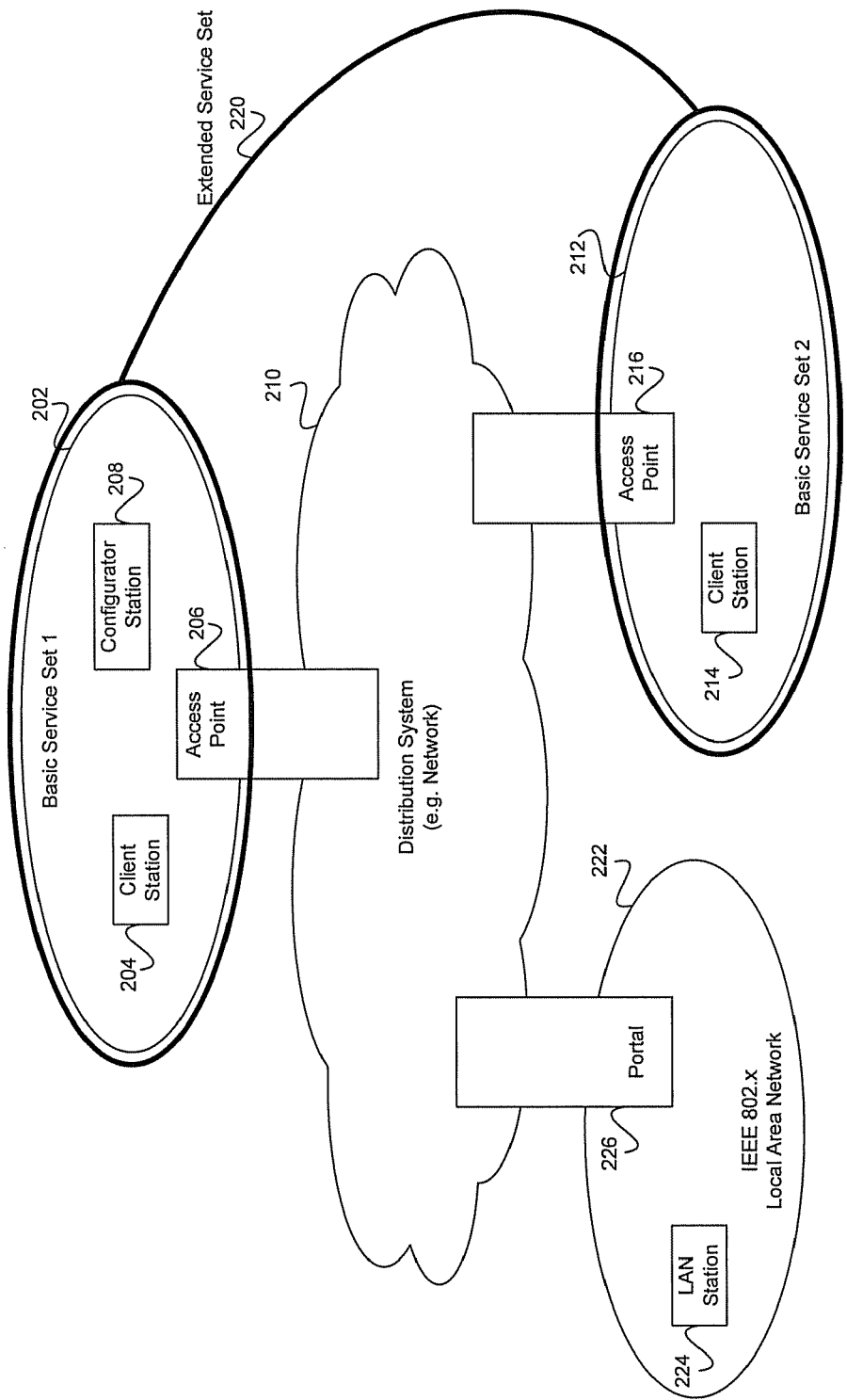
FIG. 2a is a block diagram of an exemplary system for wireless data communications comprising a centralized configurator in an ESS, in accordance with an embodiment of the invention.

FIG. 2a is a block diagram of an exemplary system for wireless data communications comprising a centralized configurator in an ESS, in accordance with an embodiment of the invention. With reference to FIG. 2a there is shown a distribution system (DS) 210, an extended service set (ESS) 220, and an IEEE 802 LAN 222. The ESS 220 may comprise a first basic service set (BSS) 202, and may include a second BSS 212, and may also include additional BSSs. The first BSS 202 may comprise a client station 204, an AP 206 and a configurator station 208. The second BSS 212 may comprise a client station 214, and an AP 216. The IEEE 802 LAN 222 may comprise a LAN station 224, and a portal 226. The AP 206 and 216 may serve a station role and/or a distribution role.

An ESS 220 may comprise at least a portion of a network, further comprising a plurality of subnetworks. A single BSS 202 may comprise a subnetwork that comprises a portion of an ESS 220. A BSS 202 may comprise a plurality of proximately located stations that may communicate wirelessly, via a wireless medium. A BSS 202 that is also associated with an ESS 220 may be referred to an infrastructure BSS. The wireless medium may comprise an RF channel. The ESS 220, comprising a plurality of BSS 202 and 212, for example, may be identified by a unique service set identifier (SSID). The portal 226 may also be a member in the ESS 220. Stations 204 and 214, associated with an ESS 220, may communicate via a wireless medium and/or via a distribution system medium, for example the DS 210. The DS 210 may comprise a distribution system medium that further comprises a wired medium and/or a wireless medium. A wired medium may comprise a physical communications channel that enables STA 204 to transmit information via a plurality of communications technologies, for example electrical or optical signals.

The AP 206 may enable STA 204 to transmit information via the DS 210. The portal 226 may enable a LAN station 224, which is located in a traditional IEEE 802 LAN, to communicate with an IEEE 802.11 STA 204, via the DS 210. A traditional IEEE 802 LAN may comprise a wired medium. The DS 210 may utilize media access control (MAC) layer IEEE 802 addressing and/or network layer addressing. If the DS 210 utilizes MAC layer IEEE 802 addressing, the AP 206, AP 216, and/or the portal 226 may comprise Ethernet switching device functionality. If the DS 210 utilizes network layer addressing, the AP 206, AP 216, and/or the portal 226 may comprise router functionality.

The configurator 208 may configure a STA 204, thereby enabling the STA 204 to communicate wirelessly in a secure IEEE 802.11 network that utilizes encryption. The configurator 208 and the STA 204 may be located in a common BSS 202. The configurator 208, may configure a STA 204 by communicating information to the STA 204 comprising an SSID and an encryption key. The encryption key may also be referred to as a passphrase. A configured STA 204 may be authorized to utilize an IEEE 802.11 network based on the received configuration information from the configurator 208. A process by which the STA 204 is authenticated may comprise configuration of the STA 204. Various embodiments of the invention comprise a method and a system for configuring the STA 204 while requiring less manual intervention from a user than is the case with some conventional methods and/or systems for configuring the STA 204.

A non-AP station, for example, the client station 204 within the BSS 202 may subsequently form an association with the AP 206. The STA 204 may communicate an association request to the AP 206, based on the SSID that was received by the STA 204 during configuration. The AP 206, may communicate an association response to the STA 204 to indicate to the STA 204 indicate the result of the association request. By associating with the AP 206, the station 204 may become a member of BSS 202. Furthermore, by obtaining membership in BSS 202, the STA 204 may become authorized to engage in secure wireless communication with other client stations in the ESS 220. Similarly, non-AP client station 214 within a BSS 212 may form an association with the AP 216, enabling the STA 214 to become a member of BSS 212.

Subsequent to the formation of an association between the client station 204 and the AP 206, the AP 206, may communicate accessibility information about the client station 204 to other APs associated with the ESS 220, such as the AP 216, and portals such as the portal 226. In turn, the AP 216, may communicate accessibility information about the client station 204 to stations in BSS 212. The portal 226, for example an Ethernet switch or other device in a LAN, may communicate reachability information about the client station 204 to stations in LAN 222, such as LAN station 224. The communication of reachability information about the client station 204 may enable stations that are not associated in BSS 202, but are associated in ESS 220, to communicate with the client station 204.

The DS 210 may provide an infrastructure that enables a client station 204 in one BSS 202, which has been authenticated and configured in accordance with various embodiments of the invention, to engage in a secure wireless communication with a client station 214 in another BSS 212. The DS 210 may also enable a client station 204 in one BSS 202 to communicate with a LAN station 224 in a non-802.11 LAN 222, such as a wired LAN. The AP 206, AP 216, or portal 226 may provide a facility by which a station in a BSS 202, BSS 212, or LAN 222 may communicate information via the DS 210. The client station 204 in BSS 202 may communicate information to a client station 214 in BSS 212 by transmitting AP 206. The AP 206 may transmit the information via the DS 210 to the AP 216, which, in turn, may transmit the information to station 214 in BSS 212. The client station 204 may communicate information to a LAN station 224 in LAN 222 by transmitting the AP 206. The AP 206, may transmit the information via the DS 210 to the portal 226, which, in turn, may transmit the information to the LAN station 224 in LAN 222.

In various embodiments of the invention, the configurator 208 may also configure a STA 214 that is located in a different BSS. For example, the configurator 208 may be located in BSS 202, wherein the STA 214 may be located in BSS 212. Configuration information from the configurator 208 may be encapsulated and communicated to the STA 214 via the AP 206, the DS 210, and the AP 216. Subsequent to configuration by the configurator 208, the STA 214 may form an association with the AP 216, which is located in a common BSS 212 with the STA 214.

Various embodiments of the invention may not be limited to a specific method of encapsulation of the configuration information, or limited to a specific protocol for communicating the configuration information. For example, the configuration information may be encapsulated utilizing extensible authentication protocol (EAP) frames, or EAP over LAN (EAPOL) frames. In general, configuration information may be communicated between the configurator 208 and a STA 206 or 216 utilizing a plurality of protocols such as EAP or EAPOL, for example.

Figure 2B:
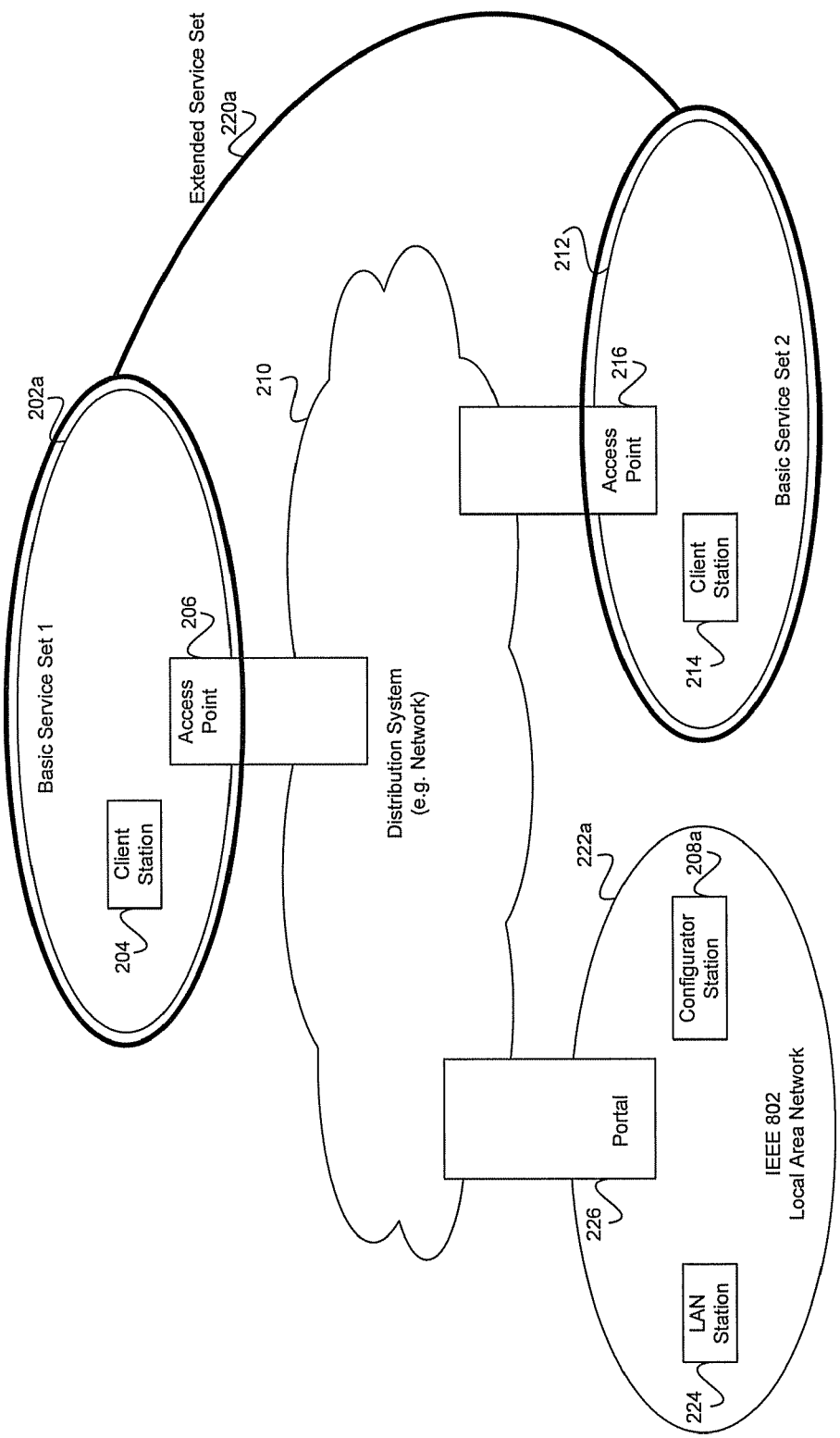
FIG. 2b is a block diagram of an exemplary system for wireless data communications comprising a centralized configurator in a LAN, in accordance with an embodiment of the invention.

FIG. 2b is a block diagram of an exemplary system for wireless data communications comprising a centralized configurator in a LAN, in accordance with an embodiment of the invention. With reference to FIG. 2b there is shown a DS 210, an ESS 220a, and an IEEE 802 LAN 222a. The ESS 220a may comprise a first basic service set (BSS) 202a, and may include a second BSS 212, and may also include additional BSSs. The first BSS 202a may comprise a client station 204, and an AP 206. The second BSS 212 may comprise a client station 214, and an AP 216. The IEEE 802 LAN 222 may comprise a configurator 208a, a LAN station 224, and a portal 226. The AP 206 and 216 may serve a station role and/or a distribution role. The description of FIG. 2b may be substantially as described in FIG. 2a. In FIG. 2a, the configurator 208a may be located in a BSS 202. By comparison, in FIG. 2b, the configurator 208a may be located in a LAN 222a.

In various embodiments of the invention, the configurator 208a, located in the LAN 222a, may configure a STA 214 that is located in a BSS 212. Configuration information from the configurator 208a may be encapsulated and communicated to the STA 214 via the portal 226, the DS 210, and the AP 216. Subsequent to configuration by the configurator 208a, the STA 214 may form an association with the AP 216, which is located in a common BSS 212 with the STA 214.

Figure 2C:
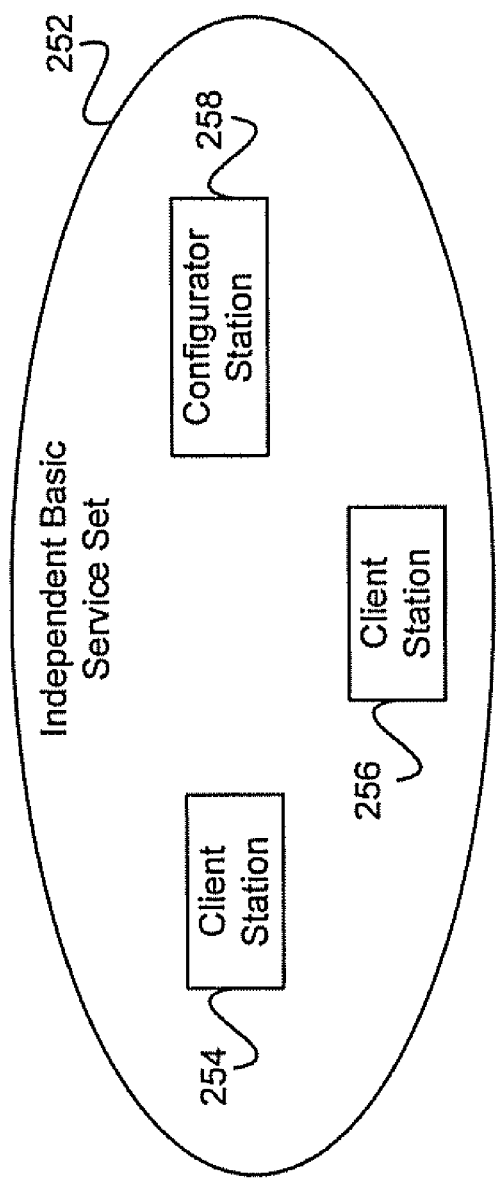
FIG. 2c is a block diagram of an exemplary system for wireless data communications comprising a configurator in an IBSS, in accordance with an embodiment of the invention.

FIG. 2c is a block diagram of an exemplary system for wireless data communications comprising a configurator in an IBSS, in accordance with an embodiment of the invention. With reference to FIG. 2a there is shown an independent basic service set (IBSS) 252. The IBSS 252 may comprise client stations 254 and 256, and a configurator station 258.

A BSS that is not associated with an ESS 220 may be referred to an IBSS 252. An IBSS 252 may comprise a plurality of proximately located stations, for example STA 254 and STA 256, which may communicate wirelessly, via a wireless medium. The wireless medium may comprise an RF channel. The IBSS 252 may be identified by a unique basic service set identifier (BSSID).

The configurator 258 may configure a STA 204, thereby enabling the STA 204 to communicate wirelessly in a secure IEEE 802.11 network that utilizes encryption. The configurator 258 may configure a STA 254 by communicating information to the STA 254 comprising a BSSID and/or a passphrase. A configured STA 254 may be authorized to utilize an IEEE 802.11 network based on the received configuration information from the configurator 258. A process by which the STA 254 is authenticated may comprise configuration of the STA 254 by the configurator 258. Various embodiments of the invention comprise a method and a system for configuring the STA 254 in an IBSS 252 while requiring less manual intervention from a user than is the case with conventional methods and/or systems for configuring the STA 254.

Figure 3:
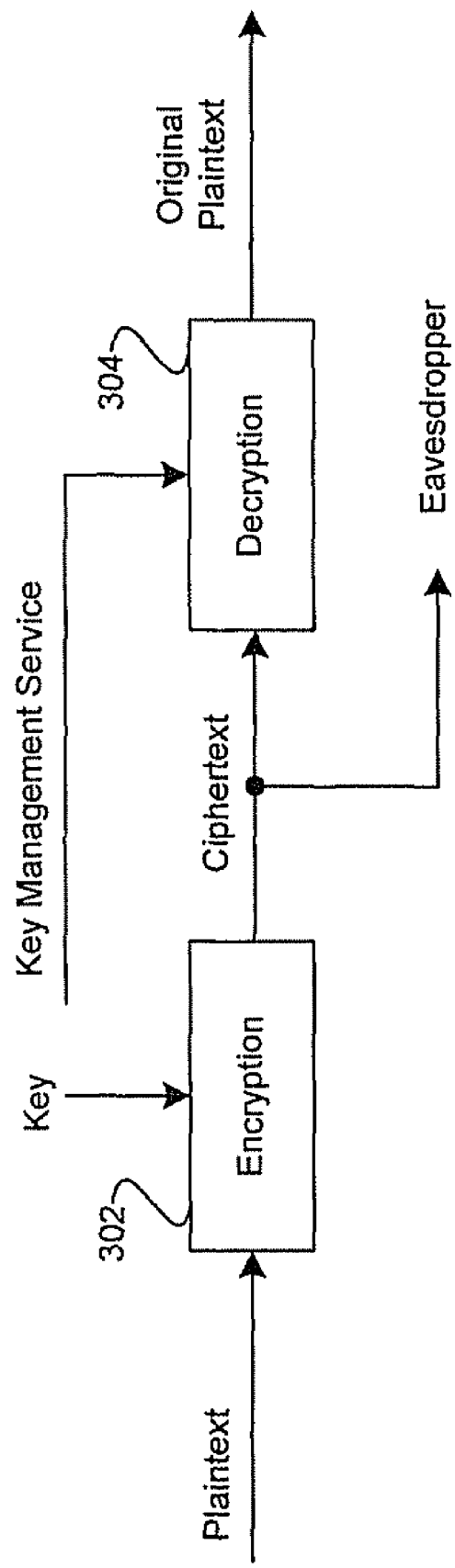
FIG. 3 is a block diagram of an exemplary secure communication system, which may be utilized in connection with an embodiment of the invention.

FIG. 3 is a block diagram of an exemplary secure communication system, which may be utilized in connection with an embodiment of the invention. With reference to FIG. 3, there is shown an encryption block 302, and a decryption block 304. The encryption block 302 may comprise suitable logic, circuitry and/or code that may be adapted to encrypt received information based on a key provided by a key management service. The decryption block 304 may comprise suitable logic, circuitry and/or code that may be adapted to decrypt received information based on a key provided by a key management service. The encryption block 302 may be adapted to encrypt, or code data so as to hide the information content from an unauthorized eavesdropper who monitors a communication channel over which the information is communicated. This encryption may enable users of WLAN systems to obtain a level of privacy in communications, which approximates that realized in wired LAN systems. Prior to transmission via an RF channel, unencrypted data, or plaintext, may be processed by the encryption block 302 into encrypted data, or ciphertext, based on a key. Information comprising the ciphertext may be securely transmitted via an RF channel. An eavesdropper may be unable to extract the plaintext from the ciphertext without gaining access to the key that was utilized to generate the ciphertext from the plaintext. Information received via a secure RF channel may be processed by the decryption block 304, which may retrieve the original plaintext from the received ciphertext based on a key. Various embodiments of the invention may comprise a key management service that provides a mechanism by which the encryption block 302 and the decryption block 304 may utilize a common key that may be referred to as a passphrase. A station, for example, a client station 204, may comprise at least one of an encryption block 302 and/or decryption block 304.

Figure 4:
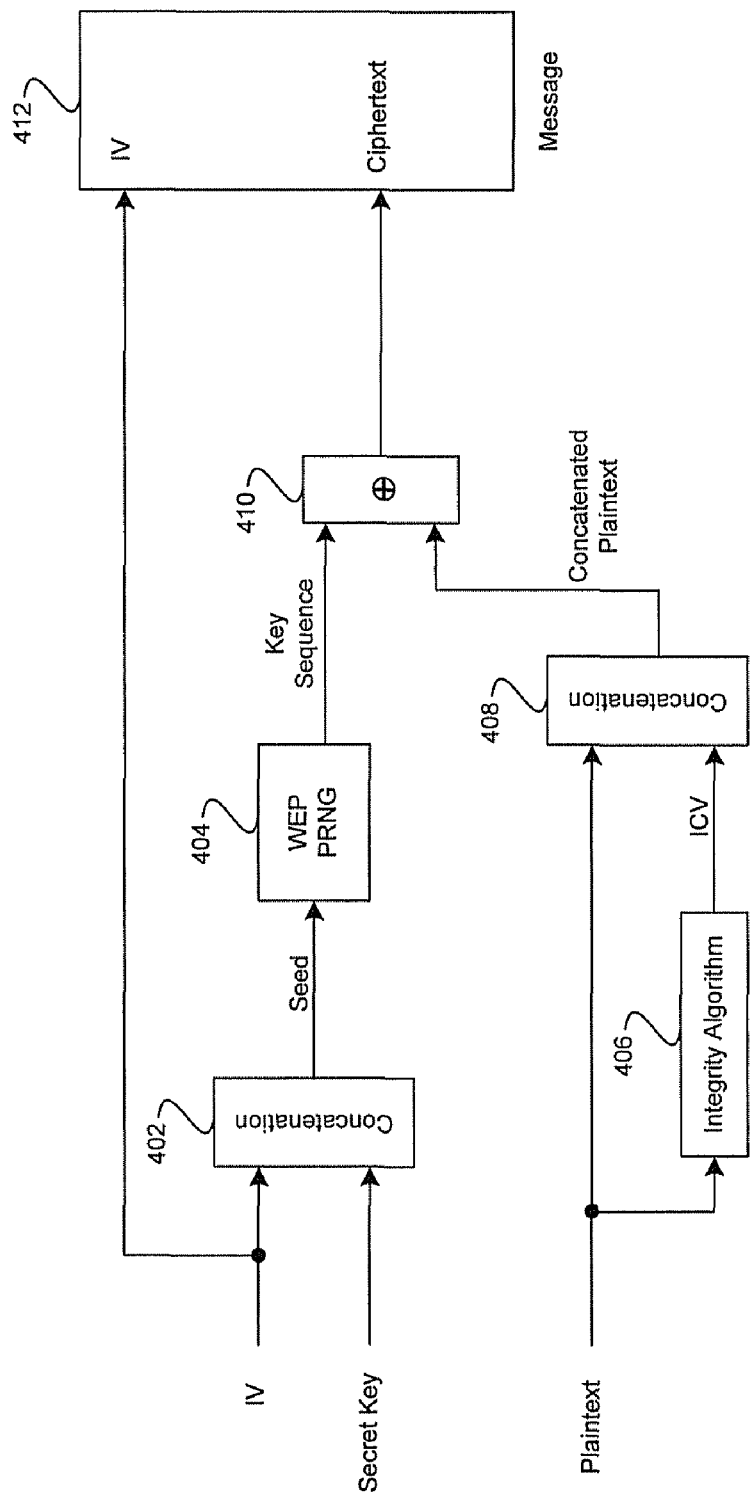
FIG. 4 is a block diagram of an exemplary encryption system, which may be utilized in connection with an embodiment of the invention.

FIG. 4 is a block diagram of an exemplary encryption system, which may be utilized in connection with an embodiment of the invention. With reference to FIG. 4 there is shown a concatenation block 402, a pseudo random number generator (PRNG) block 404, an integrity algorithm block 406, a concatenation block 408, a logical exclusive-or block 410, and a message block 412.

The concatenation block 402 may comprise suitable logic, circuitry and/or code that may be adapted to receive input comprising an initialization vector (IV), and a secret key. The IV and secret key may be processed by the concatenation block 402 to generate a seed. The PRNG block 404 may comprise suitable logic, circuitry and/or code that may be adapted to generate a key sequence based on a received seed. The integrity algorithm block 406 may comprise suitable logic, circuitry and/or code that may be adapted to process received plaintext to generate an integrity check value (ICV). The concatenation block 408 may process received plaintext and ICV to produce concatenated plaintext. The logical exclusive-or block 410 may process concatenated plaintext and a key sequence to produce ciphertext. The message block 412 may process received IV and ciphertext to generate information, which may be transmitted via an RF channel in a secure communication.

In various embodiments of the invention, the secret key, also referred to as a passphrase, may comprise an encryption key that, in turn, comprises a portion of configuration information that is communicated from a configurator 208, to a client station 204 during authentication of the client station 204. The IV may change periodically. The concatenation block 402 may receive an IV and a passphrase from a station 204 that transmits information via an RF channel. The PRNG block 404 may receive a seed from the concatenation block 402. The integrity algorithm block 406 may receive plaintext from a station that transmits information via an RF channel. The concatenation block 408 may receive an ICV from the integrity algorithm block 406, and plaintext from a station 204 that transmits information via an RF channel. The logical exclusive-or block 410 may receive a key sequence from the PRNG block 404, and concatenated plaintext from the concatenation block 408. The message block 412 may receive ciphertext from the logical exclusive-or block 410 and an IV from a station 204 that transmits information via an RF channel. An encryption block 302 may comprise a concatenation block 402, a PRNG block 404, an integrity algorithm block 406, a concatenation block 408, a logical exclusive-or block 410, and/or a message block 412.

Figure 5:
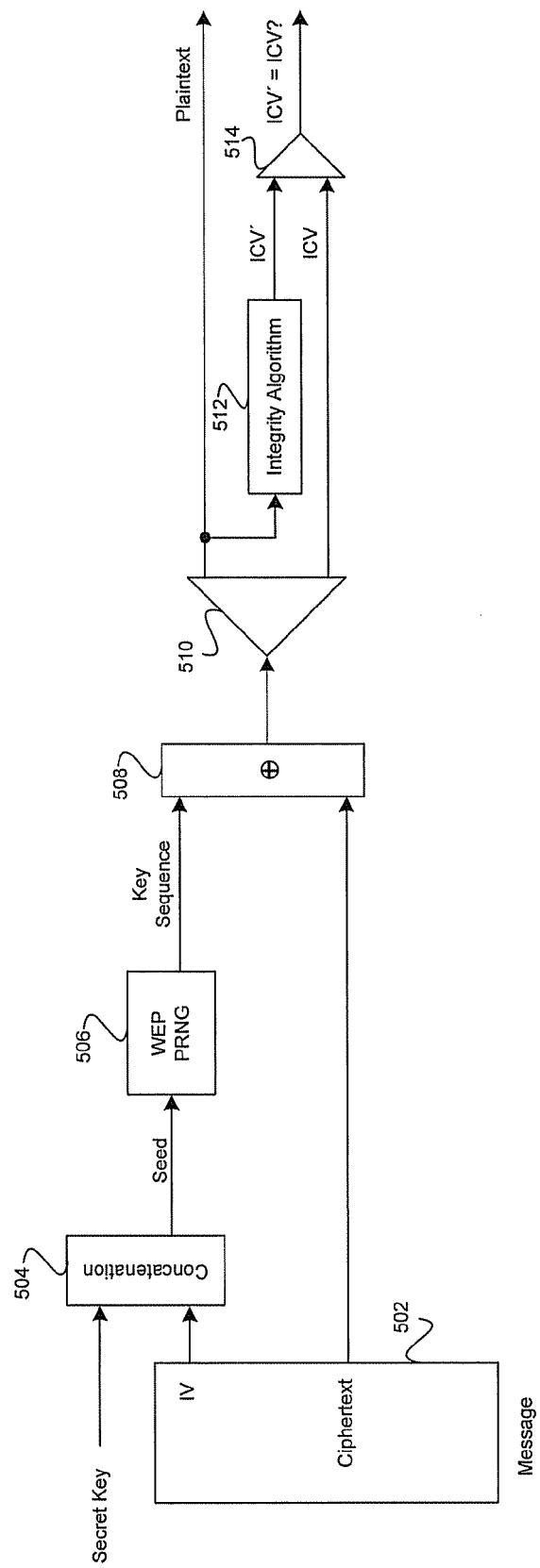
FIG. 5 is a block diagram of an exemplary decryption system, which may be utilized in connection with an embodiment of the invention.

FIG. 5 is a block diagram of an exemplary decryption system, which may be utilized in connection with an embodiment of the invention. With reference to FIG. 5, there is shown a message block 502, a concatenation block 504, a PRNG block 506, a logical exclusive-or block 508, a splitter block 510, an integrity algorithm block 512, and a combiner block 514. The message block 502 may process received information, separating the received information into constituent components comprising ciphertext and IV. The concatenation block 504 may process received IV and secret key to generate a seed. The PRNG block 506 may process a received seed to generate a key sequence. The logical exclusive-or block 508 may process received key sequence and ciphertext to decrypt the ciphertext. The splitter block 510 may process received information, separating the received information into constituent components comprising ICV and plaintext. The integrity algorithm block 512 may generate an ICV' based on received plaintext. The combiner block 514 may compare a received ICV' and ICV. The combiner block 514 may generate an output which indicates whether ICV'=ICV is true or false.

In operation the secret key may have been distributed to the concatenation block 504 utilizing a key management service. The message block 502 may receive information received by a station via an RF channel. The concatenation block 504 may receive an IV from the message block 502. The PRNG block 506 may receive a seed from the concatenation block 504. The logical exclusive-or block 508 may receive the key sequence from the PRNG block 506, and the ciphertext from the message block 502. The splitter block 510 may receive information from the logical exclusive-or block 508. The integrity algorithm block 512 may receive plaintext from the splitter block 510. The combiner block 514 may receive ICV from the splitter block 510, and ICV' from the integrity algorithm block 512. If the combiner block 514 generates an output indicating false, the received information may be determined to be in error and discarded by a station 204 that received the information via an RF channel. A decryption block 304 may comprise at least one of a message block 502, a concatenation block 504, a PRNG block 506, a logical exclusive-or block 508, a splitter block 510, an integrity algorithm block 512, and a combiner block 514.

Various embodiments of the invention may not be limited to a specific method of encryption. Accordingly, various embodiments of the invention may utilize a plurality of encryption techniques such as wired equivalent privacy (WEP), the Temporal Key Integrity Protocol (TKIP) or the Counter Mode with CBC-MAC Protocol (CCMP).

Figure 6A:
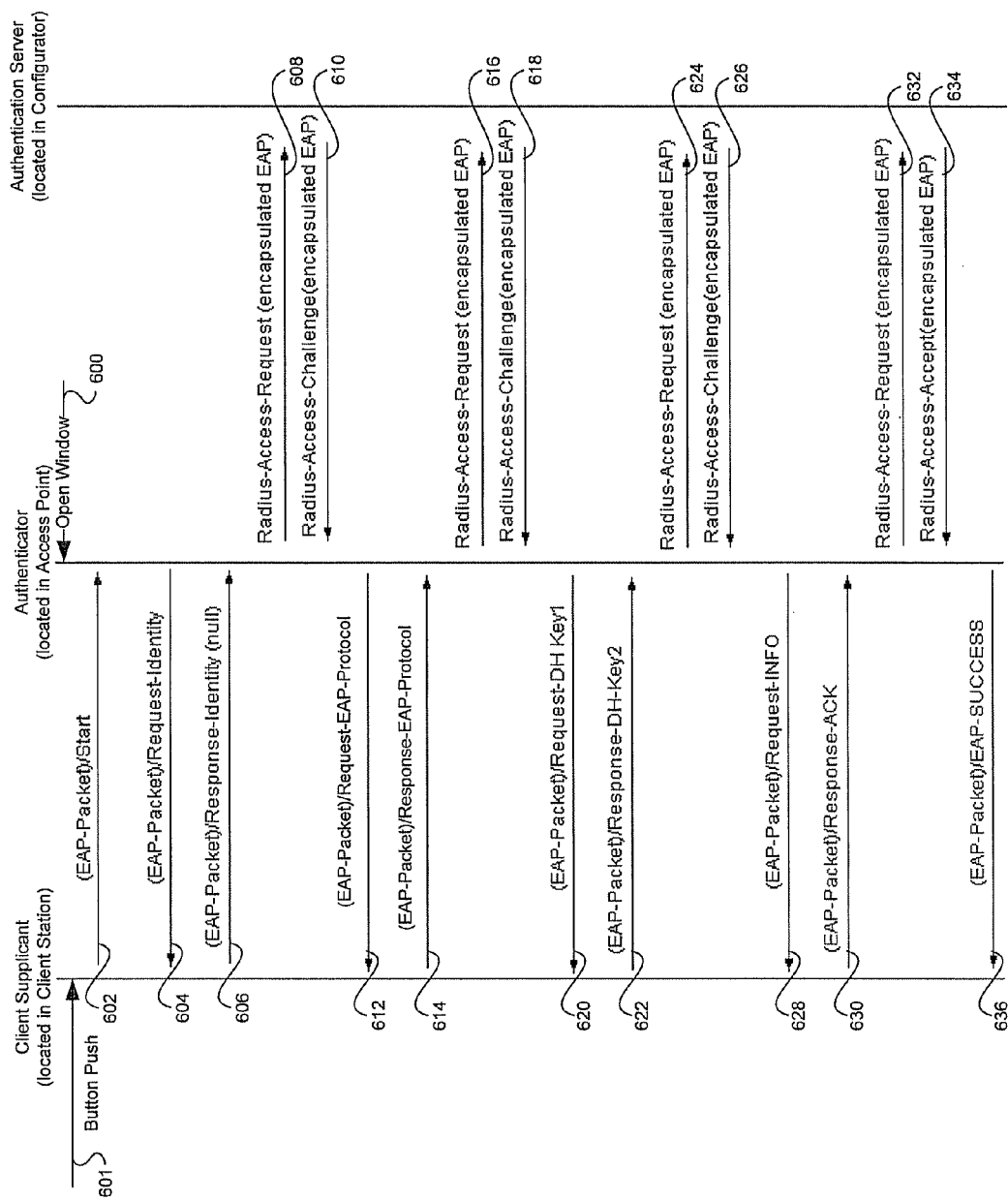
FIG. 6a is a diagram illustrating exemplary message exchanges based on a protocol and initiated at the access point, in accordance with an embodiment of the invention.

FIG. 6a is a diagram illustrating exemplary message exchanges based on a protocol and initiated at the access point, in accordance with an embodiment of the invention. FIG. 6a presents an exemplary exchange of messages between the configurator 208, the AP 206 and the client station 204, based on the protocol. In FIG. 6a, the configurator 208 may function in the role of an authentication server. The AP 206 may function in the role of an authenticator. The client station 204 may function in the role of a supplicant. A supplicant may comprise a client station 204 that is requesting to be authenticated by an authenticator. An authenticator may comprise an AP 206 that facilitates authentication of a supplicant. An authentication server may comprise a configurator 208 that provides an authentication service to an authenticator. The authentication service may be utilized to determine, based on information provided by the supplicant, whether the supplicant is authorized to communicate information via a communications system to which the authenticator is communicatively coupled. The information provided by the supplicant may comprise authentication response information.

In step 600, a configuration timing window may be opened at the AP 206. The opening of the configurator timing window may correspond to the start of a time duration at which a client station 204 may be configured by the configurator 208. The configurator timing window may define a period of time during which a client station 204 may be configured by utilizing an AP 206 that may at least function in a role of authenticator.

In accordance with various embodiments of the invention, the configurator timing window may be opened based on activation of a button located at the AP 206. The time duration for which the configurator timing window remains open subsequent to a button activation may be configured at the AP 206. Upon opening of the configurator timing window, the AP 206 may transmit beacon frames, in accordance with IEEE 802.11, that comprise authentication enablement information, in accordance with an embodiment of the invention. The authentication enablement information may specify a configurator timing window. This specification may comprise information that indicates whether the configurator 208 is ready to configure a client station 204 that requests configuration, and/or whether the configurator 208 has already configured a client during the current configurator timing window open time interval. Subsequent to the ending of the configurator timing window open time interval, the AP 206 may transmit beacon frames that do not comprise authentication enablement information.

In step 601, a button may be activated at the client station 204. Subsequent to activating a button at a client station 204, the client station 204 may initiate a discovery protocol. The discovery protocol may comprise a process by which a client station 204 locates an AP 206 that may at least function in a role of authenticator. The client station 204 may initiate a scanning process comprising receipt of one or more beacon frames transmitted by one or more APs 206. A client station 204 may discover an AP 206 that may function in a role of authenticator when the client station 204 receives a beacon frame that comprises authentication enablement information. An AP 206 that functions in a role of authenticator may be referred to as an authenticator. A configurator 208 that functions in the role of an authentication server to an authenticator may be referred to as an authentication server. A client station 204 that functions in the role of supplicant may be referred to as a supplicant.

Subsequent to discovery of an AP 206 that may at least function in the role of authenticator, the client station 204 may perform an open authentication and join with the AP 206 in accordance with IEEE 802.11 procedures.

In step 602 the supplicant may communicate an EAP start frame to the authenticator. The EAP start frame may indicate to the authenticator that the supplicant is ready to be configured. In step 604, the authenticator may communicate an EAP request-identity frame to the supplicant. In step 606, the supplicant may respond by communicating an EAP response identity frame to the authenticator. Steps 604 and 606 may comprise a message exchange through which the supplicant may establish an identity with the authenticator.

The authenticator may communicate information received from the supplicant to the authentication server. The authenticator may communicate with the authentication server by utilizing, for example, the remote authentication dial-in user service (RADIUS). In step 608, the authenticator may utilize the EAP response identity packet, associated with step 606, to generate a RADIUS access-request message. The RADIUS access-request message may comprise at least a portion of information derived by the authenticator based on the EAP response identity packet associated with step 606. The authenticator may encapsulate a RADIUS access-request message within an EAP frame. In step 610, the authentication server may respond to the RADIUS access-request message associated with step 608 by communicating a RADIUS access-challenge message to the authenticator. The authentication server may encapsulate a RADIUS access-challenge message within an EAP frame.

In step 612, the authenticator may communicate an EAP request-protocol frame to the supplicant. The EAP request-protocol frame may comprise information that indicates a protocol that may be utilized to configure the supplicant. In step 614, the supplicant may communicate an EAP response-protocol frame to the authenticator. The EAP response-protocol frame may comprise information that indicates whether the supplicant accepts utilization of a protocol that was indicated in the EAP request-protocol frame associated with step 612. In step 616, the authenticator may communicate a RADIUS access-request message to the authentication server. The RADIUS access-request message, associated with step 616 may comprise at least a portion of the information derived by the authenticator based on the received EAP response-protocol frame associated with step 614. In step 618, the authentication server may respond by communicating a RADIUS access-challenge message to the authenticator.

In step 620, the authenticator may communicate an EAP request-key1 frame to the supplicant. The EAP request-key1 frame may comprise a configurator key. In step 622, the supplicant may communicate an EAP response-key2 frame to the authenticator. The EAP response-key2 frame may comprise a client key. Steps 620 and 622 may comprise a key exchange between the authenticator and the supplicant. In step 624, the authenticator may communicate a RADIUS access-request frame to the authentication server. The RADIUS access-request frame, associated with step 624, may comprise at least a portion of the information, derived by the authenticator, based on the key exchange between the authenticator and the supplicant. In step 626, the authentication server may communicate a RADIUS access-challenge frame to the authenticator. The RADIUS access-challenge frame, associated with step 626, may comprise configuration information. In step 628, the authenticator may communicate an EAP request-info frame to the supplicant. The EAP request-info frame may comprise configuration information. In step 630, the supplicant may communicate an EAP response-ack frame to the authenticator. The EAP response-ack frame may indicate successful configuration of a client station 204 by the supplicant. In step 632, the authenticator may communicate a RADIUS access-request message to the authentication server. The RADIUS access-request message, associated with step 632, may comprise at least a portion of information, derived by the authenticator, based on the received EAP response-ack frame, associated with step 630. In step 634, the authentication server may communicate a RADIUS access-accept message to the authenticator. The RADIUS access-accept message may comprise information that indicates that the successfully configured client station 204 has been registered with a configurator 208. In step 636, the authenticator may communicate an EAP protocol-success frame to the supplicant. The EAP protocol-success frame may comprise information that indicates, to the supplicant, that the client station 204 has been registered with a configurator 208.

In operation, the client station 204 may wirelessly communicate a message, for example an EAP frame that is associated with step 602, to the AP 206. The client station 204 and the AP 206 may be located in a common infrastructure BSS 202. Upon receipt of the message, for example an EAP frame, the AP 206 may recognize the packet based on an Ether type that is associated with the received message. Based on recognition of, for example, an Ether type associated with the received message, the AP 206 may communicate the received message to the configurator 208. The configurator 208 may be located in the common infrastructure BSS 202 with the client station 204 and the AP 206.

The configurator 208 may be located in a subsequent infrastructure BSS 212 that comprises a different infrastructure BSS than does the common infrastructure BSS 202. In this case, the message communicated from the AP 206 may be transmitted via the DS 210 to an AP 216 located in the subsequent infrastructure BSS 212. The AP 216 may then communicate the message, received from the AP 206 via the DS 210, to the configurator 208 that is located in the subsequent BSS 212.

The client station 204 may communicate a message, for example an EAP frame such as is associated with step 602, to the configurator 208 via a wired interface, for example via a wired Ethernet medium. The AP 206 may communicate a message, received from the client station 204, to the configurator 208 via a wired interface.

Subsequent to communicating a message, for example an EAP frame associated with step 636, the AP 206 may transmit beacon frames comprising updated authentication enablement information. The updated authentication enablement information may comprise information that indicates that the AP 206 is not available to function in a role of authenticator for client stations 204 requesting to be configured by the configurator 208. The updated authentication enablement information may comprise information indicating whether a client station has already been configured by the configurator 208 during a time interval in which the current configurator timing window is open. The updated authentication enablement information may comprise information indicating that the configurator 208 is not available to configure a requesting client station 204.

Figure 6B:
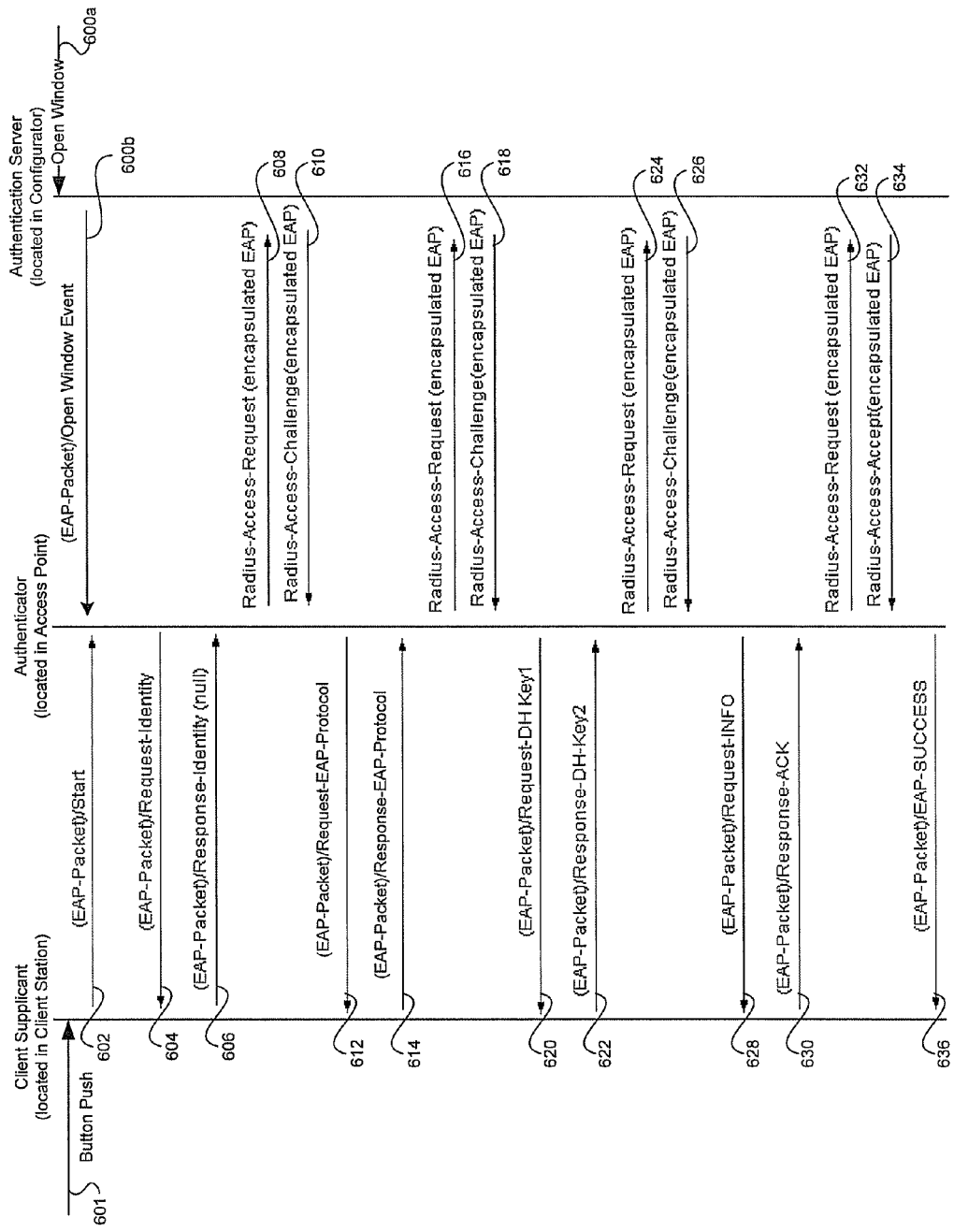
FIG. 6b is a diagram illustrating exemplary message exchanges based on a protocol and initiated at the configurator, in accordance with an embodiment of the invention.

FIG. 6b is a diagram illustrating exemplary message exchanges based on a protocol and initiated at the configurator, in accordance with an embodiment of the invention. FIG. 6b presents an exemplary exchange of messages between the configurator 208, the AP 206 and the client station 204, based on the protocol. FIG. 6b is substantially as described in FIG. 6a. In FIG. 6a, a configurator timing window is opened at the AP 206. By comparison, in FIG. 6b, a configurator timing window is opened at the configurator 208.

In step 600a, a configuration timing window may be opened at the configurator 208. The opening of the configurator timing window may correspond to the start of a time duration during which a client station 204 may be configured by the configurator 208. The configurator timing window may define a period of time during which a client station 204 may be configured by utilizing a configurator 208 that may at least function in a role of authentication server. In accordance with various embodiments of the invention, the configurator timing window may be opened based on activation of a button located at the configurator 208. The time duration for which the configurator timing window remains open subsequent to a button activation may be configured at the configurator 208. Upon opening of the configurator timing window, in step 600b, the configurator 208 may communicate an open window event message to the AP 206, for example. The open window event message, for example, may comprise a notification from the configurator 208 to the AP 206 that a configurator timing window has been opened. The configurator 208 may selectively communicate the open window notification to one or more APs 206. An AP 206 that receives the open window notification from the configurator 208 may subsequently transmit beacon frames that comprise authentication enablement information.

Subsequent to closing of the configurator timing window open time interval, the configurator 208 may communicate a close window event message to the AP 206, for example. The close window event message, for example, may comprise a closed window notification from the configurator 208 to the AP 206 that a configurator timing window has expired. The configurator 208 may selectively communicate the closed window notification to one or more APs 206. An AP 206 that receives the closed window notification from the configurator 206 may subsequently transmit beacon frames that do not comprise authentication enablement information.

In step 601, a button may be activated at the client station 204. Subsequent to activating a button at a client station 204, the client station 204 may initiate a discovery protocol. The client station 204 may initiate a scanning process comprising receipt of one or more beacon frames transmitted by one or more APs 206. A client station 204 may discover an AP 206 that may function in a role of an authenticator when the client station 204 receives a beacon frame that comprises authentication enablement information. Subsequent to discovery of an AP 206 that may at least function in the role of authenticator, the client station 204 may perform an open authentication and join with the AP 206 in accordance with IEEE 802.11 procedures. Subsequent steps in FIG. 6*b* may be substantially as described in FIG. 6*a*.

An AP 206 that functions in a role of authenticator may be configured to locate a configurator 208 that functions in a role of authentication server. The configurator configuration information at the AP 206 may comprise: an SSID, a passphrase, a configurator address, a proxy enable flag, and/or an open window button location parameter. The configurator address may comprise an address, associated with a network, which may be affixed to a message, for example an EAP frame that is associated with step 608, such that a message so affixed may be delivered to a configurator 208, via the network. The configurator address may be affixed to the message by the AP 206, for example. The network may comprise a DS 210, a BSS 202, and/or a LAN 222. The proxy enable flag may comprise a variable that may be set to a value, for example a Boolean value of TRUE or FALSE. A value proxy enable flag=TRUE may enable the AP 206 to recognize an Ether type associated with a received packet, for example a packet received from a client station 204 associated with an EAP Ether type, and transmit the received packet to the configurator 208, located at the configurator address, via a DS 210.

The open window button location parameter may indicate, to the AP 206, a location of a button that may be activated to initiate a configurator timing window open time interval. The open window button location parameter may indicate that the button to be activated is located at the AP 206, or at the configurator 208 for example. If the button to be activated is located at the AP 206, then the configurator timing window open time interval may be started by activating a button located at the AP 206. The procedures associated with this option are illustrated in FIG. 6*a*. If the button to be activated is located at the configurator 208, then the configurator timing window open time interval may be started by activating a button located at the configurator 208. The procedures associated with this option are illustrated and described with regard to FIG. 6*b*.

The AP 206 may be configured manually, or by another AP 216. The AP 206 may be configured by the AP 216 via a wireless interface or via a wired interface. The AP 206 may be configured by the configurator 208 via a wired interface. An AP 216 that functions in a role of AP-configurator may configure another AP 206. An AP 206 that functions in a role of AP-client may be configured by another AP 216. Subsequent to a button activation at an AP-configurator AP 216, the AP 216 may transmit beacon frames comprising information that indicates whether the AP 216 may function in a role of AP-configurator. Subsequent to a button activation at an AP-client AP 206, the AP 206 may receive a beacon frame from an AP 216, which may indicate that the AP 216 may function in a role of AP-configurator.

An AP-client AP 206 may wirelessly exchange messages comprising configurator configuration information with the AP-configurator AP 216 that result in the AP 206 being configured. The configured AP 206 may subsequently configure client station 204 that are located in a common BSS with the AP 206. The AP 206 may function in a role as an authenticator and locate the configurator 208, functioning in a role as an authentication server, based on the configurator configuration information received wirelessly from the AP-configurator AP 216.

An AP-client AP 206 may exchange messages comprising configurator configuration information with the AP-configurator AP 216 that result in the AP 206 being configured via a wired interface. The configured AP 206 may subsequently configure client station 204 that are located in a common BSS with the AP 206. The AP 206 may function in a role of authenticator and locate the configurator 208, functioning in a role of authentication server, based on the configurator configuration information received via a wired interface from the AP-configurator AP 216.

Figure 7:
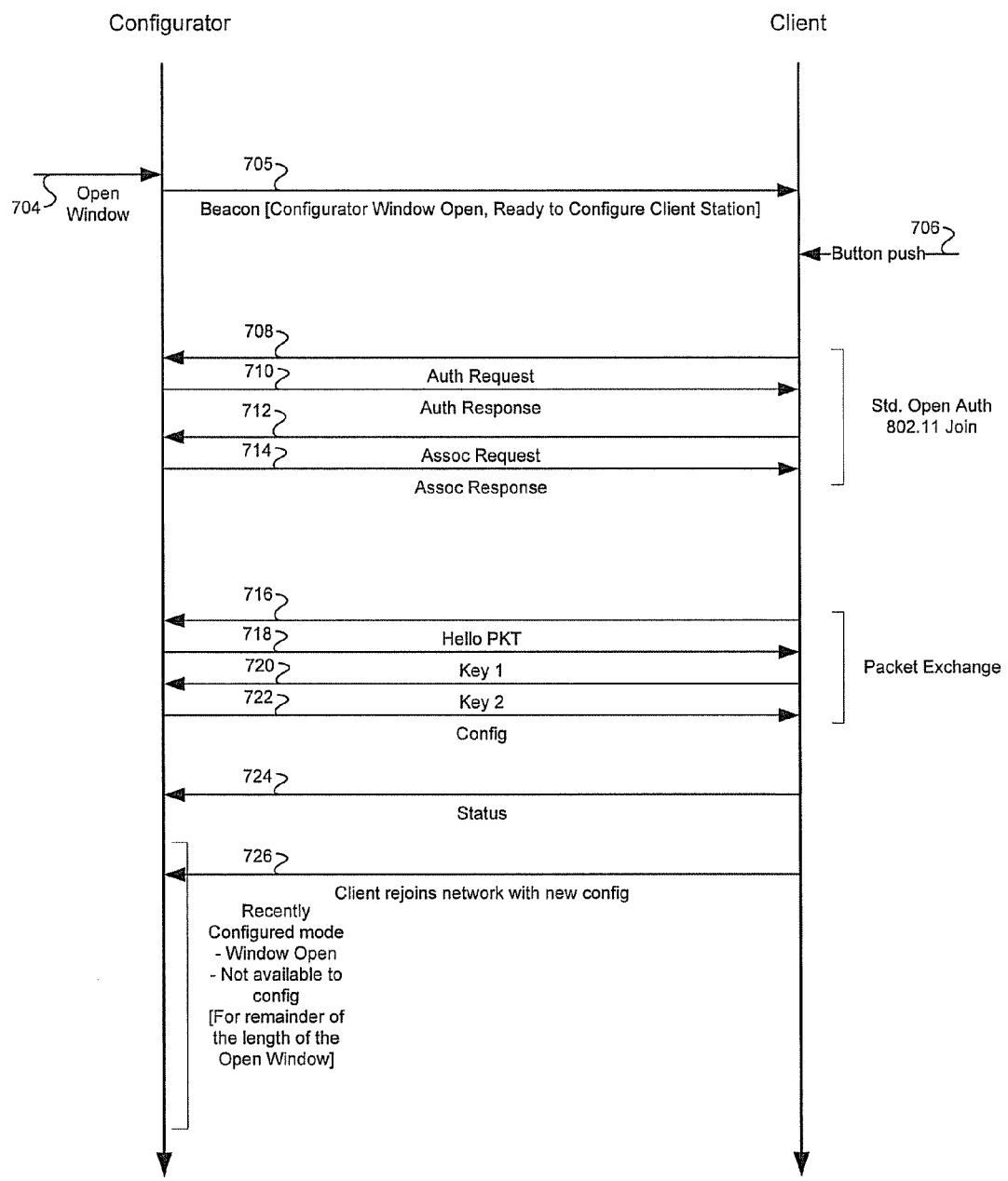
FIG. 7 is a diagram illustrating exemplary message exchanges based on a protocol and initiated at the configurator located in an IBSS, in accordance with an embodiment of the invention.

An AP 206 may be configured by a configurator 208 via a wired interface. A button located at a configurator 208, which is activated may result in notification messages being transmitted via a wired network, for example a LAN 222. The notification message may utilize a broadcast address such that the notification message is communicated to a plurality of devices that are communicatively coupled to the LAN 222. The notification message may comprise information that indicates that the configurator 208 may function in a role of AP-configurator. The notification message may comprise an EAP echo request message, for example. A button located at the AP 206, which is activated may result in the AP 206 communicating a notification response message to the configurator 208. The notification response message may comprise information substantially as described for the hello packet associated with step 716 (FIG. 7). The notification response message may comprise an EAP reply message, for example. The AP 206 may subsequently exchange messages comprising configurator configuration information with the configurator 208.

U.S. application Ser. No. 11/208,284 filed Aug. 18, 2005, provides a detailed description of procedures by which an AP-configurator may configure an AP-client, and is hereby incorporated by reference in its entirety.

In various embodiments of the invention, a configurator 208 and an AP 206 may be collocated. A collocated configurator 208 and AP 206 may be referred to as a collocated device. A collocated device may comprise the functionality of an AP 206 and a configurator 208. U.S. application Ser. No.

11/207,302 filed Aug. 18, 2005, provides additional description of the collocated device, and is hereby incorporated by reference in its entirety.

FIG. 7 is a diagram illustrating exemplary message exchanges based on a protocol and initiated at the configurator located in an IBSS, in accordance with an embodiment of the invention. Referring to FIG. 7, in step 704, a button may be activated at the configurator 258 to open a configurator timing window. The opening of the configurator timing window may correspond to the start of a time duration during which a client station 254 may be configured by the configurator 258. The time during which the configurator timing window remains open subsequent to a button activation may be configured at the configurator 258. The configurator 258 may comprise a non-AP station that is located in a common IBSS with the client station 254.

In step 705, at a time instant subsequent to the opening of the configurator timing window in step 704, the configurator 258, may transmit beacon frames, in accordance with IEEE 802.11, comprising authentication enablement information, in accordance with an embodiment of the invention. The authentication enablement information may indicate that the configurator timing window is open, and that the configurator 258 is ready to configure a client station 254. In one embodiment of the invention, the authentication enablement information may comprise a flag field, window_open, which may be set to a Boolean value to indicate whether the configurator timing window is open or closed. A logical value window_open=TRUE, or a numerical value window_open=1 may indicate that the configurator timing window is open, for example. A logical value window_open=FALSE, or a numerical value window_open=0 may indicate that the configurator timing window is closed, for example. The authentication enablement information may comprise a flag field, recently_cfg, which may be set to a Boolean value to indicate whether the configurator 258, is ready to configure a client station 254. A logical value recently_cfg=FALSE, or a numerical value recently_cfg=0 may indicate that the configurator 258, is ready to configure a client station 254, for example. A logical value recently_cfg=TRUE, or a numerical value recently_cfg=1 may indicate that the configurator 258, has already configured a client station 254 during the current configurator timing window open time interval and is not ready to configure a client station 254, for example.

At a time instant when a configurator timing window is opened, a subsequent first beacon message, associated with the step 705, may be transmitted by the configurator 258. The message, associated with the step 705, may comprise flags window_open=TRUE, indicating that the configurator timing window is open, and recently_cfg=FALSE, indicating that the configurator 258, is ready to configure a client station 254. Beacon frames transmitted by the configurator 258, at instants in time during which the configurator timing window is not open may not comprise authentication enablement information. In step 705, the transmitted beacon frames may be received by a client station 254.

In a client station 254, activation of the button, located at a client station 254 may initiate step 706. In step 706, a client timing window may be opened at the client station 254. The opening of the client timing window may correspond to the start of a time duration in which a client station 254 may request to be configured by the configurator 258. Subsequent to the opening of the client timing window, the client station 254 may communicate authentication response information to the configurator 258, via one or more messages associated with the steps 708, 712, 716, 720 and 724. The client station 254 may communicate the one or more messages, associated with the steps 708, 712, 716, 720 and 724, comprising authentication response information based on authentication enablement information contained in the transmitted beacon frame during a time interval in which the configurator timing window was open.

Steps 708, 710, 712, and 714 may comprise message exchanges based on IEEE 802.11 comprising an open authentication and join of a basic service set (BSS) as defined in IEEE 802.11. The BSS utilized during open authentication may utilize a different SSID than that utilized by the IBSS 252 during secure communications. In step 708, an authentication request message may be sent by the client station 254, to the configurator 258. In step 710, the configurator 258, may send an authentication response message to the client station 254. In step 712, the client station 254 may send an association request message, associated with the step 712, to the configurator 258. In step 714, the configurator 258, may send an association response message, associated with the step 714, to the client station 254.

Steps 716, 718, 720, and 722 may comprise a packet exchange based on the protocol, in accordance with various embodiments of the invention. The packet exchange may utilize, but may not be limited to, the Diffie-Hellman (DH) protocol. In step 716, the client station 254 may communicate a hello packet to the configurator 258. The hello packet, associated with the step 716, may indicate to the configurator 258, that the client station 254 is ready to be configured. In step 718, the configurator 258, may communicate a key1 message to the client station 254. The key1 message, associated with the step 718, may comprise a configurator key. In step 720, the client station 254 may communicate a key2 message to the collocated device 258 functioning as a configurator. The key2 message, associated with the step 720, may comprise a client key.

In step 722, the configurator 258, may communicate a configuration message to the client station 254. The configuration message, associated with the step 722, may comprise configuration information that may be utilized to authenticate a client station 254. The configuration information communicated in the configuration message, associated with the step 722, may be encrypted based on the configurator key and/or the client key. In step 724, the client station 254 may communicate a status message to the configurator 258. The status message 724 may be sent subsequent to decryption of at least a portion of the configuration message 722. The client station 254 may utilize the configurator key and/or the client key to decrypt at least a portion of the configuration message, associated with the step 722, that was previously encrypted by the configurator 258. The status message, associated with the step 724, may indicate whether the client station 254 was successfully configured during the packet exchange. If the client station was successfully configured, the status message, associated with the step 724, may indicate success. The configurator 258, may store authentication information about the configured client 254 in persistent memory. Persistent memory may comprise any of a plurality of device storage technologies that may be utilized to maintain information about the configured client station 254 until action is taken to release the stored information from persistent memory. These actions may comprise, manual intervention at the configurator 258, by a user, or automatic intervention by a software process executing at the configurator, for example.

In step 726, the client station 254 may rejoin the WLAN based on the received configuration information. The steps performed during the rejoin, associated with the step 726, may be substantially as defined in IEEE 802.11. The rejoin, associated with the step 726, may occur via a secure RF channel that utilizes the received configuration information in step 722. For example, the rejoin, associated with the step 726, may utilize the SSID that was received by the client station during the packet exchange. Subsequent to configuration of the client station 254, the configurator 258, may not be available to configure another client station 256 during the current configurator registration window time interval. Beacon frames may be transmitted by the configurator 258, subsequent to the configuration of the client station 254. These beacon frames may comprise information that indicates that the configurator timing window is closed, and that the configurator 258, has already configured a client station 254 during the current configurator timing window open time duration. This may indicate to a subsequent client station 256 that receives the beacon frames that the configurator 258, is not currently ready to configure a client station 256.

In various embodiments of the invention, the packet exchange, comprising the steps 716, 718, 720, 722 and 724, may be performed by a configurator 258, and a client station 254 that communicate wirelessly, via a wireless medium. The configurator 258, and client station 254 may also communicate during the packet exchange via a wired medium, for example, via an Ethernet LAN 222. If the configurator 258, receives a packet, for example an authentication request, associated with the step 708, from the client station 254, via a wireless medium, subsequent packet exchanges between the configurator 258, and client station 254 may be communicated wirelessly. If the configurator 258 receives a packet from the client station 254, via a wired medium, subsequent packet exchanges between the configurator 258, and client station 254 may be communicated via a wired medium. The received packet may be, for example, a hello packet, associated with the step 716.

Figure 8:
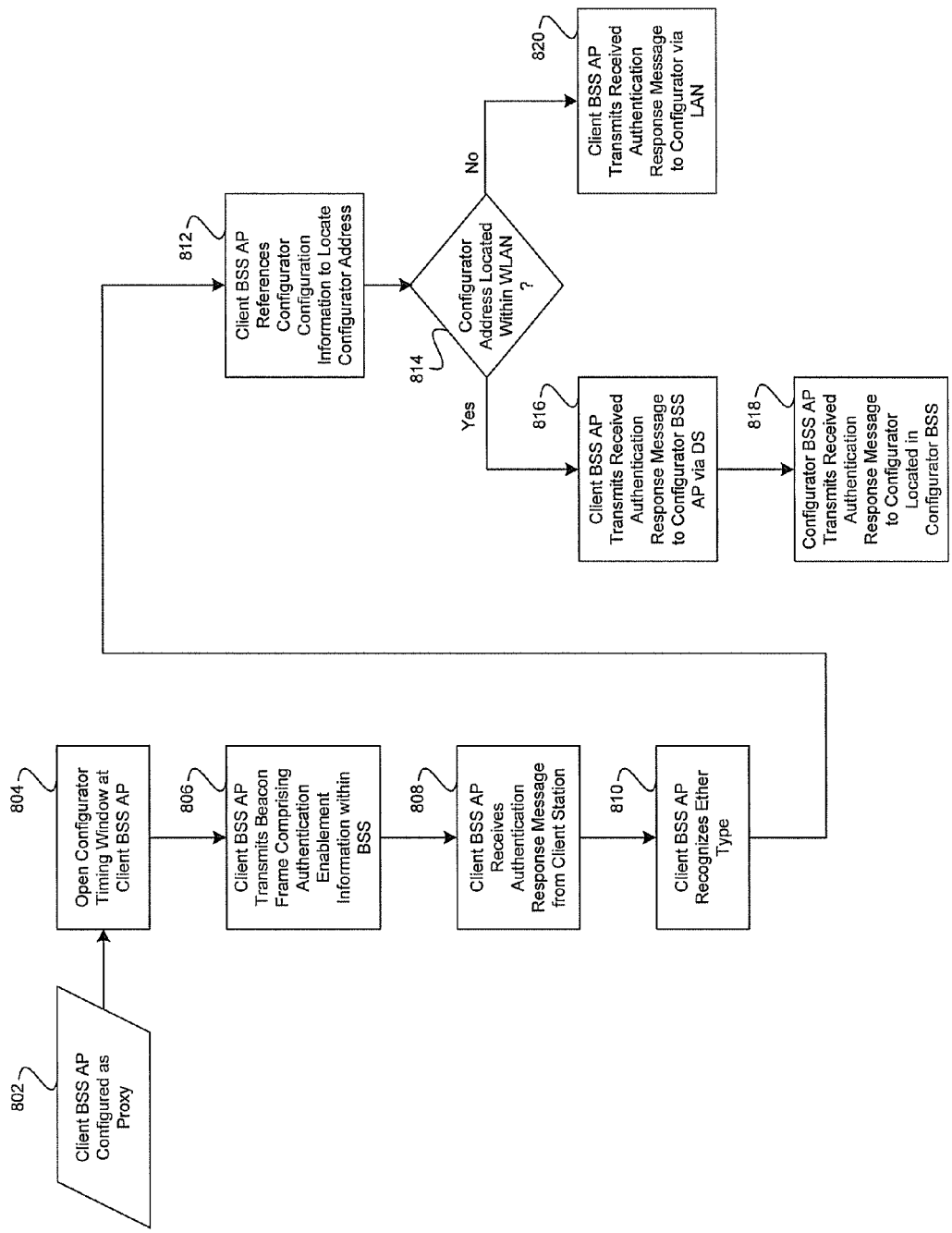
FIG. 8 is a flowchart illustrating exemplary steps in a process for transporting configuration messages across a DS, which is initiated at a client BSS access point, in accordance with an embodiment of the invention.

FIG. 8 is a flowchart illustrating exemplary steps in a process for transporting configuration messages across a DS, which is initiated at a client BSS access point, in accordance with an embodiment of the invention. Referring to FIG. 8, in step 802 a client BSS AP 216, an AP that is located in a common BSS 212 with the client station 214 that is requesting configuration from a configurator 208, may be configured to enable the client station 214 to be configured by a configurator 208 in another BSS 202. The client BSS AP 216 may be configured so that proxy enable=TRUE, for example. In step 804, a button may be activated at the client BSS AP 216 that opens a configurator timing window at the client BSS AP 216. In step 806 the client BSS AP 216 may transmit beacon frames within the BSS 212. The transmitted beacon frames may comprise authentication enablement information.

In step 808, the client BSS AP 216 may receive an authentication response message from the client station 214. An EAP frame may comprise the authentication response message, for example. In step 810, the client BSS AP 216 may recognize, for example, an EAP frame Ether type. The client BSS AP 216 may process the receive authentication response message based on this recognition, and based on, for example, a value associated with configurator configuration information comprising a proxy enable flag. In step 812, the client BSS AP 216 may reference configurator configuration information to locate a configurator address, based on, for example, a value of proxy enable=TRUE. The configurator address may be utilized by the client BSS AP 216 to locate the configurator 208.

In step 814, the client BSS AP 216 may determine whether the configurator address is located within a WLAN. This evaluation may determine whether the client BSS AP 216 is to communicate with the configurator 208 wirelessly, or via a wired interface. If the communication is to occur wirelessly, in step 816, the client BSS AP 216 may transmit the received authentication response message to a configurator BSS AP 206 via the DS 210. The configurator BSS AP 206 may comprise an AP that is located in a common BSS 202 with the configurator 208. In step 818, the configurator BSS AP 206 may transmit the received authentication response message to the configurator 208 located within the configurator BSS 202. If the communication is determined to occur via a wired interface in step 814, in step 820, the client BSS AP 216 may transmit the received authentication response message to the configurator 208 via a LAN 222.

Figure 9:
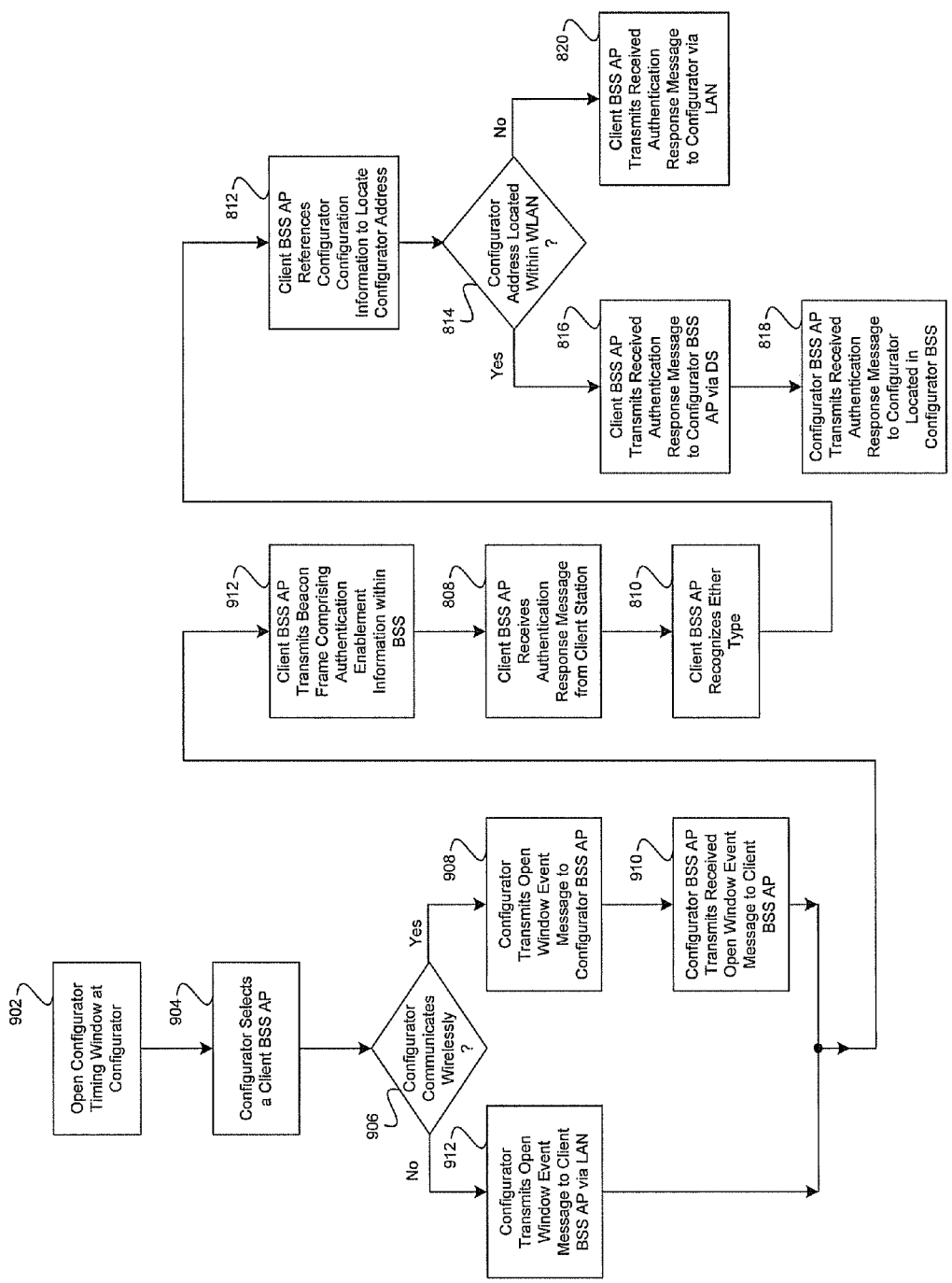
FIG. 9 is a flowchart illustrating exemplary steps in a process for transporting configuration messages across a DS, which is initiated at a configurator, in accordance with an embodiment of the invention.

FIG. 9 is a flowchart illustrating exemplary steps in a process for transporting configuration messages across a DS, which is initiated at a configurator, in accordance with an embodiment of the invention. Aspects of FIG. 9 are substantially as described in FIG. 8. In FIG. 9, the configurator timing window is opened at the configurator 208. The configurator 208 then selects a client BSS AP 206, and communicates an open window event message to the selected client BSS AP 206. Subsequent steps follow corresponding steps in FIG. 8. The client BSS AP 216 may be configured to enable the client station 214 to be configured by a configurator 208 in another BSS 202.

Referring to FIG. 9, in step 902, a button may be activated at the configurator 208 that opens a configurator timing window at the configurator 208. In step 904, the configurator 208 may select a client BSS AP 216. The configurator 208 may establish subsequent communication with the selected client BSS AP 216 while a current configurator timing window is open. In step 906, the configurator 208 may determine whether communication with the client BSS AP 216 is to occur via a wireless or wired interface. If communication is to occur wirelessly, in step 908, the configurator 208 may transmit, for example, an open window event message to the configurator BSS AP 206. An open window event message, for example, may comprise information that indicates to the selected client BSS AP 216, that the configurator 208 has opened a configurator timing window, during which a client station 214 located in the client BSS 212 may be configured by the configurator 208. An EAP frame may comprise an open window event message, for example. In step 910, configurator BSS AP 206 may transmit a received open window event message to the client BSS AP 216 via the DS 210. If communication is determined to occur via a wired interface in step 906, in step 912, the configurator 208 may transmit an open window event message to the client BSS AP 216 via a LAN 222.

In step 914, upon receipt of the open window event message, wireless or via a LAN 222, the client BSS AP 216 may transmit beacon frames within the BSS 212. The transmitted beacon frames may comprise authentication enablement information. In step 808, the client BSS AP 216 may receive an authentication response message from the client station 214. In step 810, the client BSS AP 216 may recognize, for example, an EAP frame Ether type. In step 812, the client BSS AP 216 may reference configurator configuration information to locate a configurator address.

In step 814, the client BSS AP 216 may determine whether the configurator address is located within a WLAN. If the communication is to occur wirelessly, in step 816, the client BSS AP 216 may transmit the received authentication response message to a configurator BSS AP 206 via the DS 210. In step 818, the configurator BSS AP 206 may transmit the received authentication response message to the configurator 208 located within the configurator BSS 202. If the communication is determined to occur via a wired interface in step 814, in step 820, the client BSS AP 216 may transmit the received authentication response message to the configurator 208 via a LAN 222.

Figure 10:
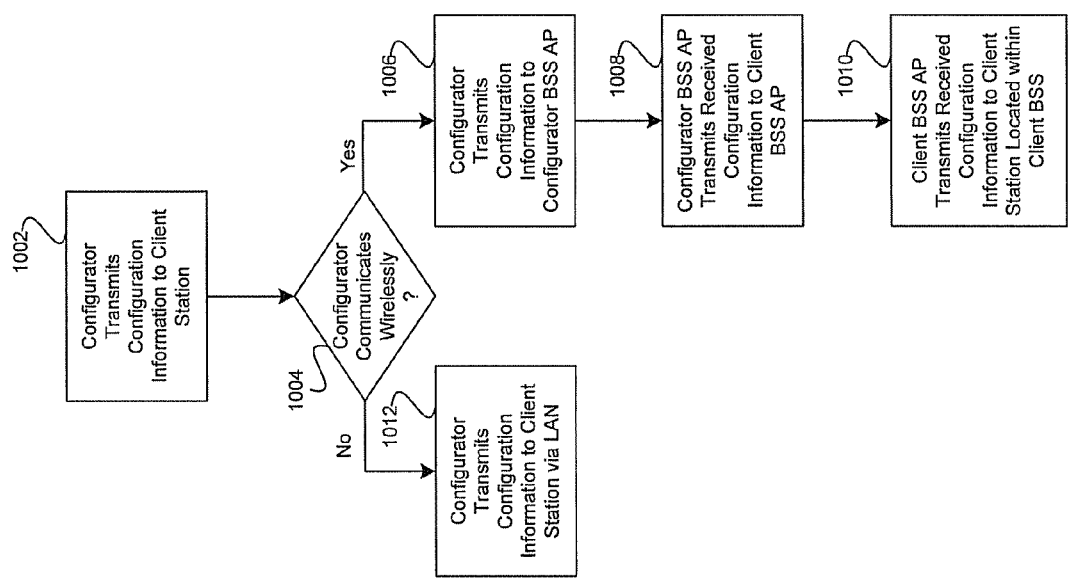
FIG. 10 is a flowchart illustrating exemplary steps in a process for transporting configuration messages, between a configurator and a client station, across a DS, in accordance with an embodiment of the invention.

FIG. 10 is a flowchart illustrating exemplary steps in a process for transporting configuration messages, between a configurator and a client station, across a DS, in accordance with an embodiment of the invention. Referring to FIG. 10, in step 1002, the configurator 208 may transmit configuration information to the client station 214. An EAP frame may comprise configuration information, for example. In step 1004, the configurator 208 may determine whether communication between the configurator 208 and the client station 214 is to occur wireless, or via a wired interface. If it is determined that communication is to occur wirelessly, in step 1006, the configurator 208 may transmit configuration information to the configurator BSS AP 206. In step 1008, the configurator BSS AP 206 may transmit the received configuration information to the client BSS AP 216. In step 1010, the client BSS AP 216 may transmit the received configuration information to the client station 214 located within the client BSS 212. If it is determined that communication is determined to occur via wired interface in step 1004, in step 1012, the configurator 208 may transmit configuration information to the client station 216 via a LAN 222.

Figure 11:
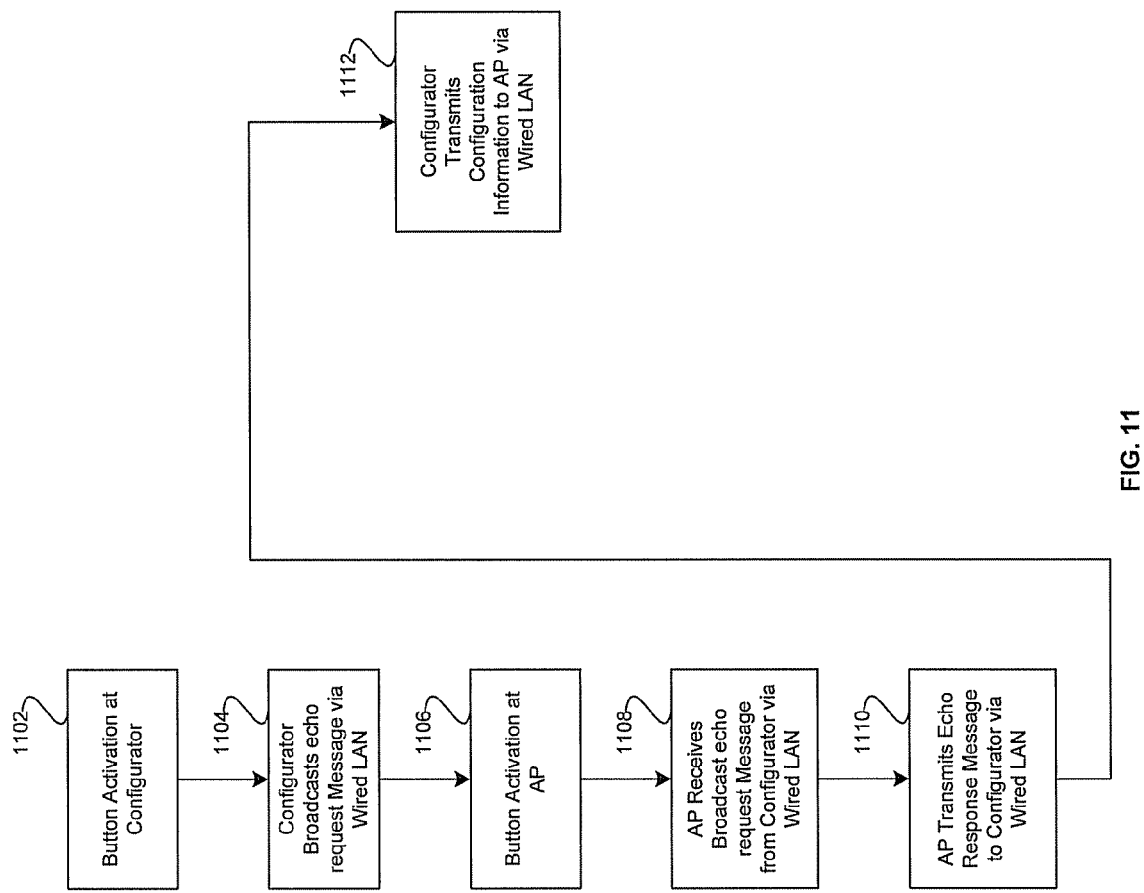
FIG. 11 is a flowchart illustrating exemplary steps in a process for configuration of an AP by a configurator, in accordance with an embodiment of the invention.

FIG. 11 is a flowchart illustrating exemplary steps in a process for configuration of an AP by a configurator, in accordance with an embodiment of the invention. Referring to FIG. 11, in step 1102, a button may be activated at the configurator 208. The button activation may open a configurator timing window at the configurator 208. In step 1104, the configurator 208 may broadcast an echo request message, for example, via a wired LAN 222. The broadcast may comprise communicating an echo request message, for example, to a plurality of devices that are communicatively coupled to the wired LAN 222. The echo request message, for example, may comprise information that may indicates that the configurator 208 may configure a client-AP that requests configuration from the configurator 208. An EAP frame may comprise information that indicates whether the configurator 208 may configure a client-AP, for example.

In step 1106, a button may be activated at a client-AP, for example, AP 216. In step 1108, the client-AP AP 216 may receive the broadcast echo request message, for example, from the configurator 208 via the wired LAN 222. In step 1110, the client-AP AP 216 may transmit a response message, for example an echo response message, to the configurator 208, via the wired LAN 222. An EAP frame may comprise the response message, for example. In step 1112, the configurator 208 may transmit configurator configuration information to the client-AP AP 216 via the wired LAN 222.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for enabling communication of information, the method comprising:
   in an access point located in a client network:
      configuring a client station based on encapsulated configuration information received from a configurator communicatively coupled to said client network, wherein:
         said access point is configured as a proxy configurator; and
         said encapsulated configuration information indicates whether at least one other client station has been configured within a configurator timing window.

2. The method according to claim 1, comprising activating a button located at said access point prior to said configuring of said client station.

3. The method according to claim 2, comprising indicating opening of a configurator timing window for said configuring of said client station based on said activating of said button.

4. The method according to claim 1, comprising communicating authentication enablement information to said client station located in said client network.

5. The method according to claim 1, comprising receiving authentication response information from said client station located in said client network.

6. The method according to claim 1, comprising referencing said encapsulated configuration information to locate said configurator.

7. The method according to claim 1, wherein said encapsulated configuration information comprises one or more of a service set identifier, a basic service set identifier, a passphrase, a configurator address, a proxy enable flag, and/or an open window button location flag.

8. The method according to claim 1, comprising communicating accessibility information regarding said client station to one or more other configurators.

9. A method for enabling communication of information, the method comprising:
   in a configurator communicatively coupled to an access point located in a client network:
      activating a button located at said configurator to open a configurator timing window; and
      communicating encapsulated configuration information to an access point located in a client network to configure a client station located in said client network, wherein said encapsulated configuration information indicates whether at least one other client station has been configured within the configurator timing window.

10. A system for enabling communication of information, the system comprising:
one or more circuits for use in an access point located in a client network, said one or more circuits being operable to:
configure a client station based on encapsulated configuration information received from a configurator communicatively coupled to the client network, wherein:
said access point is configured as a proxy configurator; and
said encapsulated configuration information indicates whether at least one other client station has been configured within a configurator timing window.

11. The system according to claim 10, wherein said one or more circuits are operable to activate a button located at said access point prior to said configuring of said client station.

12. The system according to claim 11, wherein said one or more circuits are operable to indicate opening of a configurator timing window for said configuring of said client station based on said activating of said button.

13. The system according to claim 10, wherein said one or more circuits are operable to communicate authentication enablement information to said client station located in said client network.

14. The system according to claim 10, wherein said one or more circuits are operable to receive authentication response information from said client station located in said client network.

15. The system according to claim 10, wherein said one or more circuits are operable to reference said encapsulated configuration information to locate said configurator.

16. The system according to claim 10, wherein said encapsulated configuration information comprises one or more of a service set identifier, a basic service set identifier, a passphrase, a configurator address, a proxy enable flag, and/or an open window button location flag.

17. The system according to claim 10, wherein said one or more circuits are operable to communicate accessibility information regarding said client station to one or more other configurators.

18. The system according to claim 10, wherein a button located at said configurator is activated prior to said receipt of said encapsulated configuration information from said configurator.

19. The method according to claim 9, wherein said encapsulated configuration information comprises one or more of a service set identifier, a basic service set identifier, a passphrase, a configurator address, a proxy enable flag, and an open window button location flag.

20. The method according to claim 9, comprising communicating accessibility information regarding said client station to one or more other configurators.

* * * * *